June 25, 1963 K. A. BASFORD ETAL 3,095,030
HYDRO-MECHANICAL GOVERNOR
Filed July 10, 1959 2 Sheets-Sheet 2

United States Patent Office 3,095,030
Patented June 25, 1963

3,095,030
HYDRO-MECHANICAL GOVERNOR
Kenneth Arnold Basford, Alvaston, Derby, and Thomas Johnson Panton, Derby, England, assignors to Rolls-Royce Limited, Derby, England, a British company
Filed July 10, 1959, Ser. No. 826,197
Claims priority, application Great Britain July 15, 1958
19 Claims. (Cl. 158—36.4)

This invention relates to governor devices and is concerned more particularly with hydro-mechanical governors, that is a governor comprising a flexible diaphragm separating a pair of chambers, one chamber having liquid fed to it from a pressure source through a restrictor, the other chamber being at a lower pressure and being connected to the first chamber by a flow path including an outlet controlled by a rotational-speed responsive element which is driven at a rotational speed representing an operating variable of apparatus to be controlled by the governor and which varies the effective restriction of the outlet on change of the parameter so that the hydraulic load on diaphragm is at any instant representative of the instantaneous value of the operating variable. In use the diaphragm is employed by its response to the hydraulic load to effect the desired control.

According to the present invention, a hydro-mechanical governor comprises biassing spring means loading the diaphragm in opposition to the hydraulic load and an anchorage for the spring means which is adjustable during operation of the governor to enable the governing effect to be varied in a desired manner.

According to a preferred feature of this invention, the biassing spring means is a tension spring acting on the diaphragm through a rod which at one end slides in a boss secured to the diaphragm and has a head abutting the boss under the tension of the spring and which at its opposite end is connected, for instance by a ball and socket connection, to the spring, the boss being arranged to abut stops to limit movement under tension of the spring.

According to another preferred feature of this invention, the adjustable anchorage is formed by a pivoted lever having a cam track formed on it and there is provided an adjustable member, for instance a pivoted arm, carrying a roller co-operating with the cam track to rock the lever on adjustment of the adjustable member thereby to vary the load applied by the spring on the diaphragm. By selecting the shape of the cam track, the spring load and thus the response to the governor may be varied in any desired manner according to the position of adjustment of the adjustable member.

According to yet another feature of this invention, there may be provided means to reduce the load between the roller and the cam track, said means comprising a counter spring acting on the lever forming the anchorage for the diaphragm biassing spring in the sense to oppose the load on the lever due to the diaphragm biassing spring. Such an arrangement is desirable where the hydraulic load on the diaphragm is high and therefore the load of the diaphragm biassing spring is required to be high, but the variations in the biassing load due to the spring are relatively small.

According to yet another feature of this invention, the diaphragm biassing spring may be connected with the anchorage lever through means permitting initial setting of the spring load, which means includes a clicker type lock nut. The governor may also have built into it a normally retracted spanner device for adjusting the click type lock nut.

In one application of governor device as above set forth, the diaphragm is arranged to control the operation of an hydraulic servo mechanism of the kind including a vent pipe leading from a pressure chamber, flow through which vent pipe determines a servo pressure operating in the chamber and acting on a piston forming a wall of the chamber. In this case the diaphragm may act on a valve at the outlet of the vent pipe to vary the flow through the vent pipe and thus control the servo pressure.

Such a servo mechanism is commonly employed in aircraft gas-turbine engine fuel systems to control the delivery of a multi-plunger positive-displacement pump, and a governor according to the present invention may be employed in such an arrangement to determine the maximum rotational speed at any instant of a rotor of the engine. In this case the speed-responsive device of the governor will be driven at a rotational speed proportional to the rotational speed of the rotor of the engine. The governor in such an arrangement may also be made sensitive to the fuel flow to the engine by employing a pressure fuel supply line of the engine as the pressure source of the governor, and by providing a further restrictor in the flow path between the two chambers separated by the diaphragm, this further restrictor being upstream of the outlet controlled by the speed responsive element. This further restrictor may be a variable restrictor.

One form of governor according to this invention will now be described in detail with reference to the accompanying drawings, in which.

Figure 1:
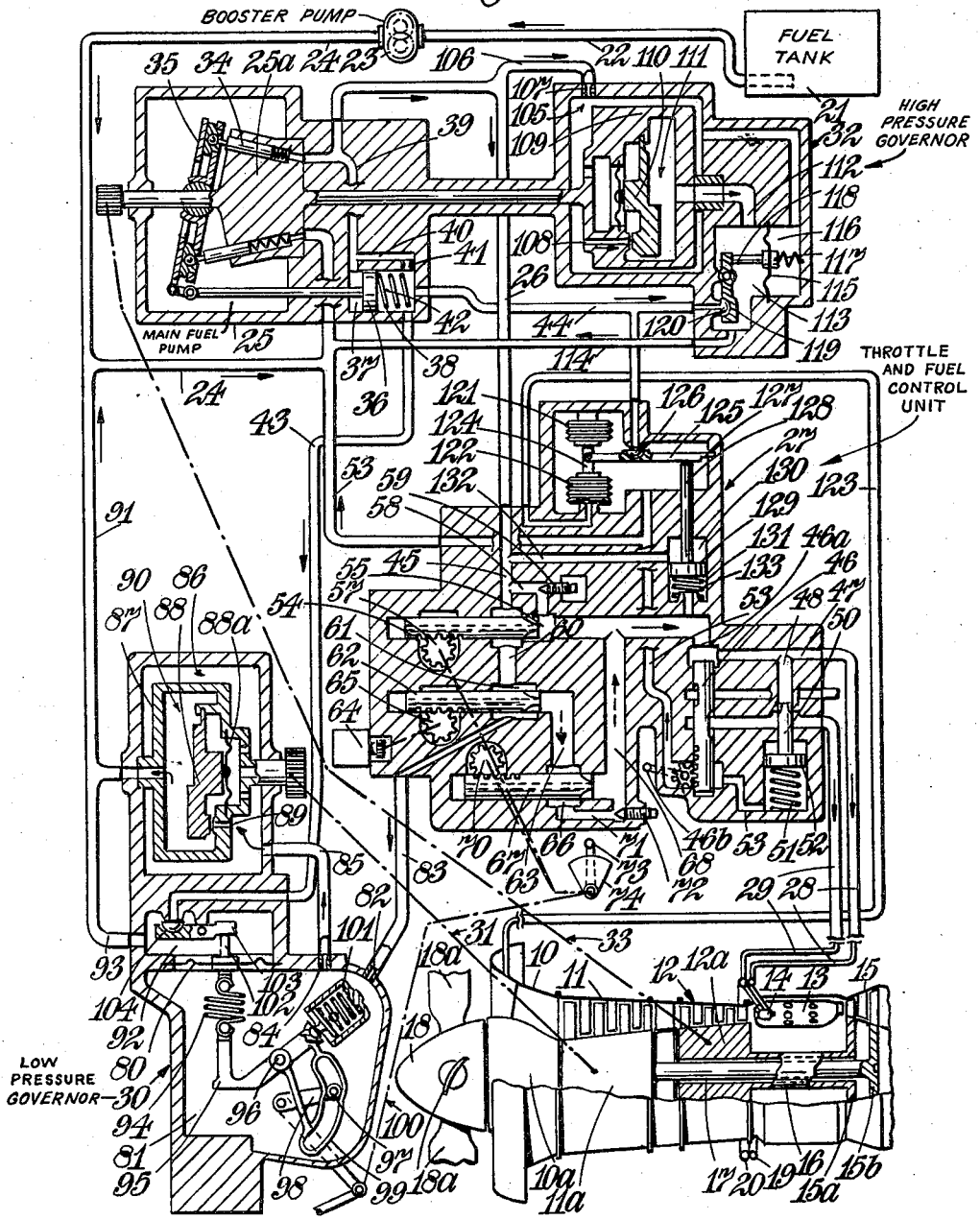
FIGURE 1 shows the governor in a fuel supply system for a gas-turbine engine.

In FIGURE 1, the engine illustrated comprises non-rotating air intake structure 10 leading to a low-pressure compressor 11 comprising a rotor 11a, the delivery of the low-pressure compressor 11 feeding the air compressed therein to the entry of a high-pressure compressor 12 having a rotor 12a.

The air leaving the high-pressure compressor 12 flows into combustion equipment 13 into which fuel is fed by fuel injectors 14 and the combustion products leave the combustion equipment 13 to pass through a multi-stage turbine 15. The turbine 15 comprises a high-pressure rotor 15a which is connected by a hollow shaft 16 to the rotor 12a of the high-pressure compressor, and a low-pressure turbine rotor 15b which is connected by a shaft 17 to the rotor 11a of the low-pressure compressor, the shaft 17 extending coaxially through the shaft 16 and the high-pressure compressor rotor 12a.

The air intake structure 10 comprises a central casing member 10a housing a reduction gear providing a driving connection between the rotor 11a of the low-pressure compressor 11 and a propeller 18. The propeller is of the variable-pitch kind and its blades 18a are arranged to be adjustable in pitch so as to be capable of operating to give either normal forward thrust for flight purposes or a reverse thrust for braking purposes.

The fuel injectors 14 may either be of the duplex type, that is, of the type having two orifices through one of which pilot fuel is injected into the combustion equipment 13 and through the other of which the main fuel supply is fed to the combustion equipment or alternatively, separate pilot and main fuel injectors may be provided. The pilot fuel supply is led to the injectors from a pilot fuel manifold 19 and the main fuel supply is led to the injectors from a manifold 20.

The fuel system illustrated for delivering fuel to the manifolds 19 and 20 from a fuel tank 21 comprises a suction pipe line 22 leading from the tank to a booster pump 23, a low-pressure fuel line 24 leading from the booster pump 23 to a main fuel pump 25, a high-pressure fuel line 26 leading from the delivery of the main pump 25 to a throttle and control unit 27, and pilot and main delivery lines 28, 29 leading from the unit 27 to the manifolds 19 and 20 respectively.

The fuel system also comprises a low-pressure hydro-mechanical governor 30 which is driven through mechanical interconnection 31 at a speed proportional to the speed of the low-pressure rotor 11a, 15b and also to the speed of the propeller 18, and a high-pressure hydro-mechanical governor 32 which, like the main fuel pump 25, is driven by mechanical interconnection 33 from the high-pressure rotor 12a, 15a.

The main fuel pump 25 is illustrated as a multi-plunger type positive-displacement pump whereof the stroke of its plungers 34 can be varied by means of a swash plate 35 the angle of inclination of which is under control of an hydraulic servo mechanism. By angularly adjusting the plane of the swash plate 35 so as to approach a plane at right angles to the axis of rotation of the pump rotor 25a the delivery of the pump 25 is decreased, and conversely, by increasing the angle between the plane of the swash plate 35 and the plane at right angles to the rotor axis, the delivery of the pump is increased.

The servo-mechanism controlling the angle of inclination of the swash plate 35 comprises a piston 36 separating a pair of cylinder spaces 37, 38, of which space 37 is directly connected by duct 39 to the delivery side of the pump 25 and of which space 38 is connected to the pump delivery by duct 39, duct 40 and flow restrictor 41. The space 38 also houses a spring 42 which operates to urge the swash plate 35 in the sense to increase the fuel pump delivery.

The space 38 has connected to it a pair of vent pipes 43, 44, of which the vent pipe 43 leads to the low-pressure hydro-mechanical governor 30 and the vent pipe 44 leads to the high-pressure hydro-mechanical governor 32 and to an air pressure control shown as part of the control and throttle unit 27.

On increase of flow through either vent pipe 43 or 44 the pressure within space 38 falls and the piston 36 moves to the right as viewed in the drawing so decreasing the inclination of the swash plate 35 and decreasing the output of the main fuel pump 25. Conversely on decrease of the flow in either of the vent pipes 43, 44 the pressure in space 38 rises so that piston 36 moves to the left increasing the fuel pump delivery.

The hydro-mechanical governors 30 and 32 are arranged to control the flow in the vent pipes 43, 44 and thus the fuel delivery to the engine so that the rotational speeds of the respective rotors do not exceed appropriate values and the air pressure control varies the fuel supply to the engine in accordance with the pressure within the air intake structure 10 thereby to accommodate variations in the engine fuel requirements due to variations in the ambient atmospheric pressure. The construction and operation of these units will be described more fully below.

The unit 27 comprises a fuel inlet duct 45 connected with the high-pressure fuel line 26 and leading to a throttle arrangement and also comprises downstream of the throttle arrangement a plunger-type shut-off cock 46 which is operated by lever 46b and controls the flow to a first outlet duct 47 connected with a pilot fuel pipe 28 and a second outlet duct 48 connected with the main fuel pipe 29. The duct 48 has connected in it a valve 50 which is displaced by the pressure of fuel in the duct 48 upstream of the valve against the action of a spring 51. The valve 50 is carried by a piston member 52 having opposite sides interconnected so that it acts as a damper for the valve 50. The piston is connected by duct 53 to the inlet side of the main fuel pump 25, and thus until the pressure just upstream of the valve 50 exceeds the inlet pressure of the pump 25 by a selected amount determined by the spring 51, fuel is only delivered to the pilot fuel delivery line 28.

The throttle arrangement comprises a first throttle plunger 54 co-operating with the inlet to a passage 55 leading to a port 46a controlled by the shut-off cock 46. The first throttle plunger is moved axially of itself by a pinion 57 and has a shaped end by which the amount of fuel entering passage 55 can be varied and a parallel-sided portion which under certain conditions of operation enters the inlet end of the passage 55 to close it or to allow a small leakage flow. The plunger 54 has associated with it a by-pass passage 58 the flow through which can be set by means of an adjustable restrictor 59. The plunger 54 will be referred to hereinafter as the "forward throttle valve" and the by-pass passage 58 will be referred to as the "idling by-pass."

The stem of the forward throttle valve 54 is surrounded by a fuel gallery 60 which is connected to deliver fuel to a further fuel gallery 61 surrounding the stem of a plunger-type throttle valve 62. The throttle valve 62 will be referred to hereinafter as the "idle throttle valve" and it co-operates with the entry to a passage 63 to control the flow therein. The idle throttle valve 62 is moved by an electrical actuator 64 via operating pinion 65 and is either set to be fully closed or to be fully open.

The downstream end of the passage 63 leads to a fuel gallery 66 surrounding the stem of a plunger-type throttle 67 which will be referred to hereinafter as the "reverse throttle valve" and the reverse throttle valve has a shaped portion at one end co-operating with the entry to a duct 68 leading from the gallery 66 to the duct 55 downstream of the forward throttle valve 54. The position of the reverse throttle valve 67 is varied by a pinion 70 and in some positions of adjustment a parallel-sided portion of the stem of the valve closes-off the connection between the gallery 66 and the duct 68 whilst in other positions the shaped end varies the cross-sectional area of entry to the duct 68.

The reverse throttle valve 67 has associated with it a by-pass passage 71 the effective restriction of which is controlled by an adjustable restrictor element 72. This by-pass will be referred to as the "flight idling by-pass."

The pinions 57 and 70 for moving the forward throttle valve 54 and reverse throttle valve 67 respectively are connected together for simultaneous movement under control of a pilot's control lever 73 which has ranges of movement in a gate 74 in both directions from the idling setting shown. Each of the throttles 54 and 67 is moved throughout the ranges of movement of the lever 73 but whilst the shaped portion of the forward throttle valve 54 is co-operating with its orifice to vary the effective area of entry to duct 55 the parallel-sided portion of the reverse throttle valve 67 occupies the entry to the duct 68, and conversely whilst the shaped portion of the throttle valve 67 is varying the area of the entry to the duct 68 the parallel-sided portion of the forward throttle valve 54 occupies the entry to the duct 55. It is arranged that in the idling setting of the lever 73 the reverse throttle valve is slightly open and the parallel portion of the forward throttle valve 54 is operative in the entry to duct 55.

In operation, when starting up the engine, the idle throttle valve 62 is set to close the entry to duct 63 so that fuel only reaches the pilot fuel line 28 leading to the engine through the idling by-pass 58 and the leak past the forward throttle valve 54. When the engine speed has reached a particular value the idle throttle valve 62 is opened and thus fuel may reach the engine not only via the idling by-pass 58 but also via the reverse throttle valve 67 and the flight idling by-pass 71. Under these conditions the engine speed tends to increase to a value which is determined when the area of the idle throttle valve 62 in opening exceeds the total areas of the reverse throttle valve opening the flight idling by-pass 71, the flow being controlled by the reverse throttle valve 67 and the flight idling by-pass 71. It is arranged that the rotational speed of the low-pressure rotor 11a, 15b and thus of the propeller 18 cannot exceed a selected value by controlling the rate of fuel supply to the engine by means of the low-pressure hydro-mechanical governor 30.

To increase forward thrust the lever 73 is moved from the idle setting shown in the appropriate direction to move the forward throttle valve 54 to the left so opening the entry to passage 55 to an increasing extent. During this movement the reverse throttle valve 67 is moved to the right so that the entry to duct 68 is closed by the parallel portion of the reverse throttle valve. During the initial part of this movement of the control lever 73 the setting of the low-pressure hydro-mechanical governor 30 is altered to increase the maximum rotational speed which the low-pressure rotor and propeller can achieve, and over a greater part of this range of movement this value of the rotational speed is constant at a value in excess of the speed of the low-pressure rotor attained in take-off.

During movement of the control lever 73 from the idling setting shown in the other range of its movement (the reverse-pitch range) the reverse throttle valve 67 is moved to the left so opening the entry to the duct 68 to an increasing extent and simultaneously the forward throttle valve 54 is moved to the right so that its parallel portion enters the entry to duct 55. During this range of movement of the control lever 73, the value of the speed to which the low-pressure rotor is governed by the low-pressure hydro-mechanical governor 30, is progressively increased.

Figure 2:
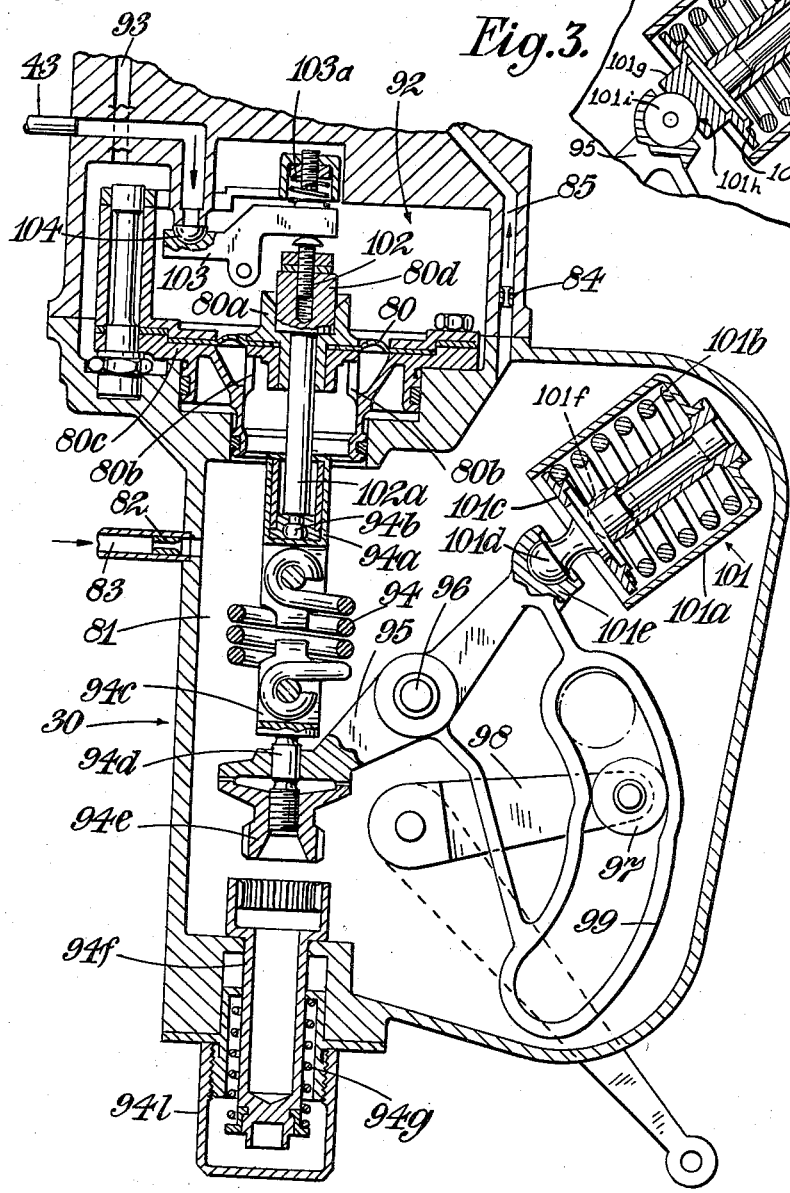
FIGURE 2 shows part of the governor in more detail.

The governor 30 is constructed in accordance with the present invention and comprises (FIGURES 1 and 2) a flexible diaphragm 80 separating chambers 81, 92. Chamber 81 is connected to the delivery side of the pump 25 through pipe 26, duct 45, conduit 83 and flow restrictor 82, and is connected through restrictor 84 and conduit 85 to chamber 86 which has an outlet through rotor 87 of the governor to a chamber 90 internally of the rotor, the chamber 90 being connected by conduit 91 to the inlet side of pump 25. The pressure within the chamber 81 thus depends on the difference in pressures between the inlet and outlet of the pump 25 and on the restrictions of the restrictors 82, 84 and outlet 89. The chamber 92 is connected by conduit 93 and conduit 91 to the inlet side of pump 25.

The rotor 87 houses a speed-responsive device 88 consisting of a lever which is pivoted to the wall of the rotor chamber 90 and extends diametrically across the chamber and a flexible diaphragm 88a which is loaded by the pressure drop across outlet 89. The free end of the lever is enlarged so that the centre of gravity of the lever is offset from the rotational axis of the rotor 87 and is laterally displaced from the diameter through the lever mounting. The end of the lever is over the outlet 89 and is formed as a plate valve and, as the speed of rotation of the rotor 87 changes, so the clearance between the lever end and the outlet 89 also changes thus varying the effective restriction of the outlet. The centrifugal load of the lever 88 is at any time balanced by the hydraulic load on diaphragm 88a, and so the pressure drop across the outlet 89 is always dependent on the rotational speed. The pressure in chamber 86 thus varies in accordance with changes of speed.

The diaphragm 80 is thus subjected to a load which varies in dependence upon changes in rotational speed of the low-pressure rotor 11a, 15b.

The governor 30 is also made sensitive to the rate of fuel flow to the engine without affecting the pressure in chamber 86. This effect is due to restrictor 84 between the chambers 81 and 86. If the fuel flow to the engine changes a corresponding change of flow occurs through the path formed by parts 83, 82, 81, 84, 86, 89, 90 and such a change of flow will cause a change of the pressure drop from chamber 81 to chamber 92, and will also tend to change to a smaller extent the pressure drop across outlet 89. However the load on diaphragm 88a will cause a corresponding movement of the lever 88 so maintaining the desired relation between speed and the pressure in chamber 86, and thus there will be a net change in the pressure drop from chamber 81 to chamber 92 dependent on fuel flow.

This contributes to governor stability as fuel flow has a relationship to engine r.p.m. and will give in effect a small amount of anticipation of r.p.m.

If, for instance, the engine speed is to be increased, the fuel flow will have to be increased before the engine speed can rise and the increased fuel flow will cause the pressure in chamber 81 to rise tending to open the half-ball valve 104. The fuel flow will therefore tend to be reduced before the engine speed reaches the governed value. This prevents a sudden cut-off of the fuel upon the engine reaching the governed speed which prevents a sudden reduction in the speed.

Since the governor 30 has a sensitivity suited to operation at the relative low rotational speeds experienced when operating with reverse thrust, the governor will tend to be upset when it is acting as an overspeed governor in forward thrust operation due to the large fuel flows experienced. The governor may be arranged to avoid this difficulty by replacing the fixed restrictor 84 by a variable restrictor; for instance the restrictor may incorporate a spring-loaded piston valve through which the fuel flows so as to create on the piston valve a pressure drop opposing its loading spring and so that when the fuel flow increases above a particular value the valve is moved against the spring to increase the effective area of the restrictor thus reducing its restriction and it is preferably arranged that the valve is adjusted by such movement to maintain the pressure drop across the restrictor at a fixed predetermined value.

The hydraulic load on the diaphragm 80 is opposed by a tension spring 94 having an anchorage 94a (FIGURE 2) at one end connected with the diaphragm 80 and an adjustable anchorage 95 at its other end. The anchorage 94a has a ball and socket connection 94b with a rod 102a carrying at its other end a tappet 102. The rod 102a slidingly engaged in a boss 80a secured centrally of the diaphragm 80 has a head 80d abutting the boss under the tension of the spring 94. The boss 80a bears on tongue-like stops 80b projecting from a mounting 80c for the diaphragm 80, the stops limiting downward movement (as viewed in FIGURE 2) of the boss 80a under the action of spring 94.

The tappet 102 co-operates with one end of a lever 103 which carries at its other end a half-ball valve 104 controlling the outflow from vent pipe 43. A spring 103a loads the lever 103 in the sense of closing the valve 104.

The anchorage 95 comprises a lever pivoted at 96 between its ends and rocking of the lever varies the tension in the spring 94. The lever 95 carries an offset cam track 99 which is engaged by a roller 97 carried by arm 98, the arm being rocked by connection 100 with control lever 73 (FIGURE 1). Angular movement of the arm 98 causes appropriate rocking of the lever 95 to vary the tension in the spring 94, the variation being dependent on the form of the cam track 99.

Figure 3:
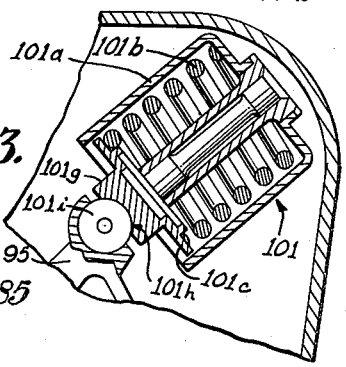
FIGURE 3 shows a modification.

In order to reduce the loads between the roller 97 and the cam track 99, the load on lever 95 of spring 94 is opposed by a device 101, which comprises a housing 101a mounted by pivots 101f on the wall of the governor device 30 and containing a compression spring 101b and a slider 101c which has an antifriction connection with lever 95 comprising a ball-headed boss 101d engaging a spherical recess 101e on the lever 95. The line of action of the load on lever 95 due to spring 101b lies to one side of the pivot 96 so that the spring 101b tends to turn the lever 95 anti-clockwise against the action of spring 94. As an alternative (FIGURE 3), the boss 101d may be replaced by a boss 101g having a semi-circular recess 101h in it, and the lever 95 may carry a roller 101i engaging the semi-circular recess.

The initial adjustment of the tension spring is effected by connecting the spring to a bracket 94c having a stud portion 94d projecting through the end of lever 95 and having threaded on it a clicker type lock nut 94e. The nut 94e is adjusted by a built-in spanner 94f which is loaded by spring 94g out of engagement from the nut 94e and is normally covered by removable cap 94h. In an alternative arrangement, spring 94g is omitted and the spanner 94f is encircled by an O-section sealing ring, and reliance is placed on the pressure in chamber 81 to hold the spanner 94f clear of the nut 94e.

In operation, the tappet 102 is normally held slightly clear of the lever 103, the spring 94 holding the boss 80a against stops 80b. However when the hydraulic load acting on the diaphragm 80 overcomes the load of spring 94, which is determined by angular setting of the arm 98 and the shape of cam track 99, the tappet 102 engages lever 103 and rocks it to lift valve 104 and permit a flow through vent pipe 43 so causing a reduction in the fuel supply to the engine tending to reduce the speed of its rotors. Since the hydraulic load on diaphragm 80 depends on the rotational speed of the low-pressure rotor of the engine, the fuel supply will stabilise at a value dependent on the loading due to spring 94 and thus upon the shape of cam track 99 and the position of lever 73.

The hydro-mechanical governor 32 (FIGURE 1) acts to reduce the fuel supply to the engine in the event that the high-pressure rotor 12a, 15a tends to overspeed and it is of generally similar construction to the hydro-mechanical governor 30 except that it does not have a variable datum adjustable by the control lever 73.

The governor 32 comprises a chamber 105 connected with the high-pressure fuel delivery line 26 by pipe 106 and restrictor 107 and having an outlet 108 through the rotor 109 of the governor under control of speed-responsive element 110. The interior 111 of the rotor 109 is connected by duct 112 to a chamber 113 having an outlet pipe connection 114 to the inlet side of the main fuel pump 25. The chamber 113 has as a wall thereof a flexible diaphragm 115 which also forms the wall of a chamber 116 connected with chamber 105. The diaphragm is also loaded by a tension spring 117 and has a tappet 118 for actuating a lever 119 carrying a half-ball valve 120 controlling one outlet from the vent pipe 44. In operation, the pressure difference across the diaphragm 115 is controlled by the speed-responsive device 110 to vary as the square of the rotational speed of the high-pressure rotor 12a, 15a and when the load on the diaphragm tends to exceed a selected value the tension spring 117 is overcome and the half-ball valve 120 is lifted so allowing increased flow through the vent pipe 44 and causing a reduction in the delivery of the fuel pump 25.

As above indicated, the unit 27 comprises means for controlling the pressure drop across the throttle in accordance with the pressure in the air intake of the engine. This means comprises a pair of capsules 121, 122 of which the capsule 121 is evacuated and the capsule 122 is subjected internally to the pressure in the air intake structure 10 via conduit 123. The two capsules are of equal area and are connected together by a rod 124 which is pivoted to one end of a lever 125 carrying a half-ball valve 126 controlling a further outlet from the vent pipe 44. The lever 125 is pivoted at 127 to the casing of the unit 27 and is also loaded in accordance with the pressure drop across the throttles. This is effected by means of a rod 128 carried by a piston 129 dividing cylinder spaces 130, 131, the space 130 connected by duct 132 to the duct 45 upstream of the throttles, and the space 131 being connected with the fuel supply passages just downstream of the throttles. The space 131 also houses a compression spring 133 urging the piston 120 towards the lever 125. It will be seen that an increase in the pressure within the air intake structure 10 tends to rock lever 125 to close the half-ball valve 126 onto the outlet from the vent pipe 44. The spring 133 also tends to close the half-ball valve 126 onto the outlet from the vent pipe. The loads applied by the capsules 121 and 122 and by the spring 133 are opposed by the load on the piston 129 which is dependent upon the pressure drop across the throttles and thus the half-ball valve 126 takes up a position under steady running conditions such that the pressure drop across the throttles is determined in accordance with the air pressure existing in the air intake structure 10. As the air pressure in the intake structure 10 increases so the pressure drop across the throttles is increased and for a given setting of the throttles the fuel flow to the engine is increased. A decrease in the air pressure resulting say from an increase in the altitude of the aircraft causes a corresponding reduction in the pressure drop across the throttles and thus for a given setting of the throttle causes a corresponding reduction in the fuel flow to the engine.

We claim:
1. A governor device comprising means defining a first chamber and a second chamber, a flexible diaphragm separating said chambers, a pressure liquid source, a low pressure region, a restrictor connecting said source to the first chamber, a restrictive outlet from the first chamber, a rotational speed responsive element adapted to be driven at a rotational speed representing an operating variable in accordance with which the governor device is to effect a control, said speed-responsive element co-operating with said restrictive outlet to vary the effective restriction thereof on variation of said rotational speed, a connection from the restrictive outlet to said second chamber and to the low pressure region, whereby a flow of liquid occurs from said source through said first chamber and said restrictive outlet to the low-pressure region and a pressure drop dependent on the said rotational speed is created across the flexible diaphragm from the first chamber to the second chamber, a biasing spring, an anchorage, the biasing spring being connected between the diaphragm and the anchorage and loading the diaphragm in opposition to the pressure drop, and controlled means connected to be adjusted by the diaphragm, said anchorage being adjustable during operation of the governor to enable the governing effect to be varied.

2. A governor device according to claim 1, the biasing spring being a tension spring, the spring being connected to the diaphragm by means comprising a boss secured to the diaphragm, and a rod which at one end slides in the boss and which has at its end a head abutting the boss under the tension of the spring and which at its opposite end is connected to the spring, there being stops co-operating in abutment with the boss to limit movement of the boss under tension of the spring.

3. A governor device according to claim 2, comprising a ball and socket connection between the rod and the spring.

4. A governor device according to claim 1, said adjustable anchorage comprising a pivoted lever having a cam track formed on it, an adjustable member, and a roller carried by the adjustable member and co-operating with the cam track to rock the lever on adjustment of the adjustable member thereby to vary the load applied by the spring on the diaphragm.

5. A governor device according to claim 4, wherein the adjustable member comprises a pivotally mounted arm, the roller being carried at the end of the arm.

6. A governor device according to claim 4, comprising also means to reduce the load between the roller and the cam track, said means comprising a counter spring acting on the lever forming the anchorage for the diaphragm biasing spring in the sense to oppose the load on the lever due to the diaphragm biasing spring.

7. A governor device according to claim 6, wherein the anchorage lever is pivoted between its ends, the biasing spring being attached to one end of the lever and an antifriction connection connecting the counter spring to the opposite end of the lever.

8. A governor device according to claim 7, the counter spring being a compression spring, and comprising a housing accommodating the counter spring, a slider slidable in the housing, the counter spring bearing on the slider and the anti-friction connection being between the slider and the end of the lever.

9. A governor device according to claim 8, wherein the anti-friction connection comprises a ball-headed boss on the slider engaging a spherical recess in the end of the lever.

10. A governor device according to claim 8, wherein the anti-friction connection comprises a roller on the end of the lever engaging a semi-circular recess in the slider.

11. A governor device according to claim 4, comprising means adjustably connecting the diaphragm biasing spring and the anchorage lever, said means permitting initial setting of the biasing spring load and including a clicker type lock nut.

12. A governor device according to claim 11 comprising also a built-in and a normally retracted spanner device for adjusting the clicker type lock nut.

13. A governor device according to claim 12, comprising a spring acting on the spanner device which is movable into engagement with the lock nut against the action of said spring.

14. A governor device according to claim 12, wherein the spanner is arranged to be held in its normally retracted position by fluid pressure within the governor.

15. A governor device according to claim 1, said controlled means comprising a hydraulic servo mechanism including a pressure chamber, a piston forming a wall of the pressure chamber, a vent pipe leading from the pressure chamber, flow through which vent pipe determines a servo pressure operating in the pressure chamber and acting on the piston, a valve controlling the outflow from the vent pipe, said diaphragm actuating the valve to vary the flow through the vent pipe and thus control the servo pressure.

16. A governor device according to claim 15 in combination with an engine having a rotor and a fuel system including a multi-plunger positive displacement fuel pump connected to deliver fuel to the engine, and a pilot's control lever, said rotational speed responsive element of the governor device being driven from said rotor, said control lever being connected to adjust said anchorage of the governor device to select a desired maximum rotational speed of said rotor for each position of said control lever, said piston of said servo mechanism being connected to adjust said multi-plunger fuel pump to vary its delivery, said valve controlling the outflow from the vent pipe of the hydraulic servo mechanism being controlled in a sense to prevent the rotational speed of the rotor exceeding the desired maximum rotational speed, said multi-plunger pump having an inlet side and pressure delivery side, said inlet side being said low-pressure region, and said pressure delivery side being said pressure liquid source.

17. The combination according to claim 16, there being provided a further restrictor connected between the first and second chambers separated by the diaphragm, this further restrictor being upstream of the restrictive outlet controlled by the speed responsive element.

18. The combination according to claim 17, wherein the further restrictor is a variable restrictor.

19. The combination according to claim 18, wherein the variable restrictor includes a spring-loaded piston valve which is moved against the spring by the pressure drop across the restrictor and which is operative on such movement to maintain the pressure drop at a fixed predetermined value.

References Cited in the file of this patent

UNITED STATES PATENTS

| | | |
|---|---|---|
| 2,479,813 | Chamberlin et al. | Aug. 23, 1949 |
| 2,481,334 | Nicolls | Sept. 6, 1949 |
| 2,857,150 | Sharp | Oct. 21, 1958 |
| 2,906,093 | Robinson | Sept. 29, 1959 |